May 16, 1933.   R. S. FALKINER ET AL   1,908,966
CANE HARVESTING MECHANISM
Filed Aug. 15, 1929   7 Sheets-Sheet 6

INVENTORS
Ralph Sadleir Falkiner
Walter George Charley
BY
E. C. Sanborn
ATTORNEY Patented May 16, 1933

1,908,966

UNITED STATES PATENT OFFICE

RALPH SADLEIR FALKINER AND WALTER GEORGE CHARLEY, OF MELBOURNE, AUSTRALIA, ASSIGNORS, BY DIRECT AND MESNE ASSIGNMENTS, TO FALKINER CANE HARVESTER CORPORATION OF AMERICA, OF NEW YORK, N. Y.

CANE HARVESTING MECHANISM

Application filed August 15, 1929. Serial No. 386,125.

This invention relates to the harvesting of sugar cane and is concerned with the provision of a sugar cane harvesting mechanism of the type shown in the U. S. patents to R. S. Falkiner, Nos. 1,651,920, December 6, 1927; 1,673,354, June 12, 1928; and 1,678,285, July 24, 1928; but presenting certain improvements and advantages thereover. One of the objects of the invention is the provision of an improved mechanism particularly effective for harvesting heavily tangled masses of cane such as are encountered, for example, in Cuba, where the cane grows in a multitude of directions, some of the cane even growing along the ground. Our invention, in addition to including means for picking up cane lying on the ground and delivering the same to the gatherers, further comprises improved gathering devices as well as improved means for severing the cane from the ground. Another feature of the invention consists of provisions whereby a plurality of rows of cane may be harvested simultaneously, the cane tops and trash removed, and the cane delivered to a given portion of the machine for removal therefrom. A further feature comprises the provision of simple and effective means whereby the harvesting mechanism may be elevated to an inoperative position when it is desired to transport the machine from one place of use to another. Other features of the invention will be hereinafter described and claimed.

In the accompanying drawings:

Fig. 4 is a bottom plan view partly broken away showing one of the knives or cutter disks for severing the cane from the ground.

Fig. 5 is a view in elevation partly in section of the cutter disk shown in Fig. 4.

Fig. 6 is a vertical sectional detail view on an enlarged scale of part of the cutter disk structure.

Referring to the drawings the machine includes a main frame designated generally as 5 and mounted on trucks 6 carrying caterpillars or endless tracks 7. Each of the trucks 6 carries guide wheels as well as a driver or sprocket wheel 8 engaging the associated track 7, the sprocket wheels for the tracks being driven through any suitable connections from an engine 9. A separate engine 10 is provided for driving various operating parts of the machine, such as the cutters, elevators, etc. later to be described.

Figure 1:
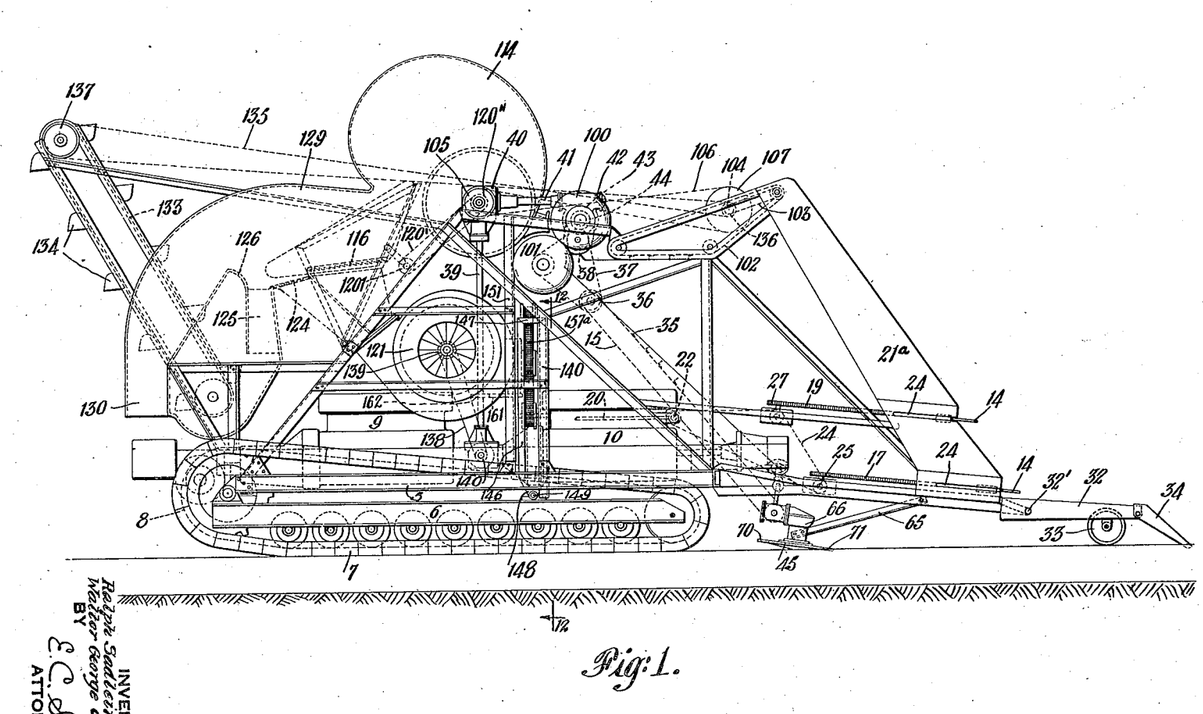
Fig. 1 is a view in side elevation of a cane harvesting mechanism illustrative of our invention.
Figures 2, 14:
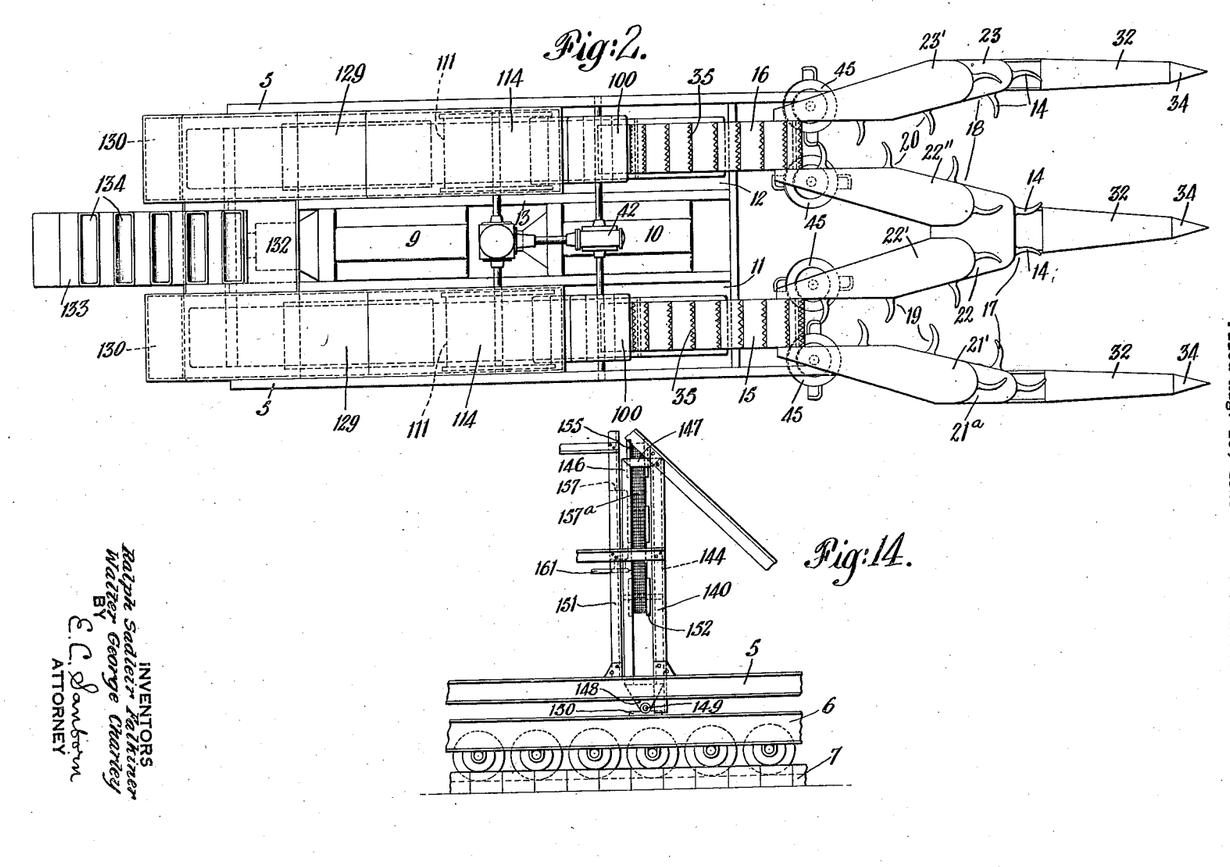
Fig. 2 is a plan view of such mechanism with parts omitted.
Fig. 14 is a view of a detail.
Figure 9:
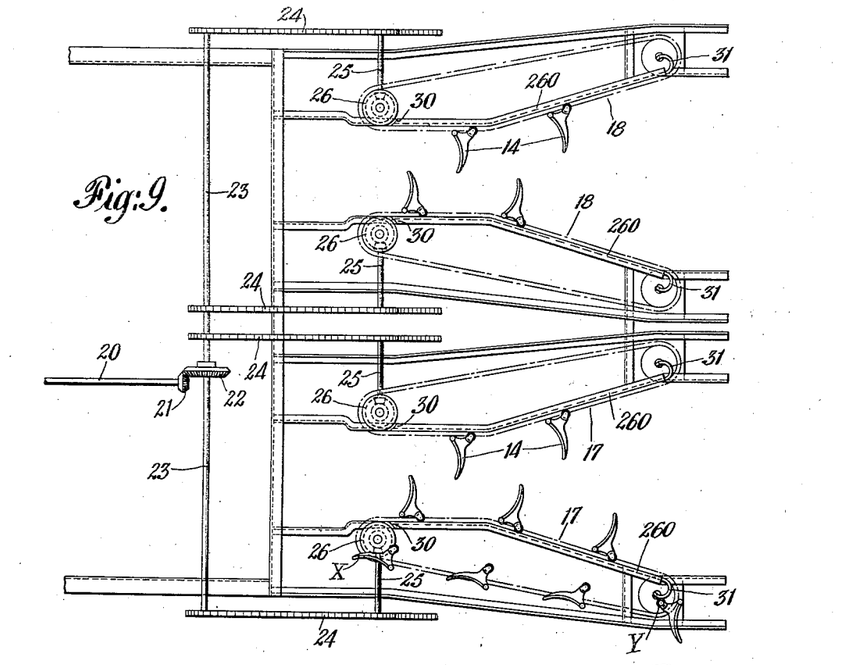
Fig. 9 is a diagrammatic plan view of a set of gathering chains and their driving devices.
Figure 12:
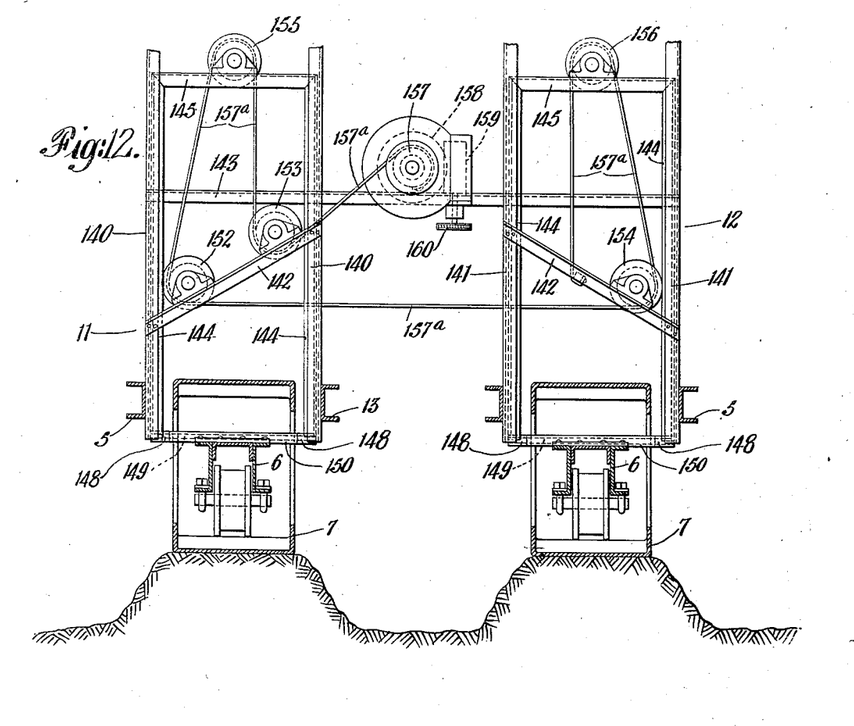
Fig. 12 is a view taken on line 12—12 of Fig. 1 and showing means for raising and lowering the harvesting mechanism with respect to the endless tracks by which it is conveyed.

The machine which we have disclosed is adapted to harvest simultaneously two rows of growing cane and for this purpose the machine may be considered as including two similar or duplicate sections designated generally 11 and 12 in Figures 2 and 12. The engines 9, 10 may be mounted in a suitable frame 13 intermediate said sections as indicated in Fig. 2. At the front of the machine are sets of gathering chains having fingers 14 for drawing the growing cane inwardly to the respective elevators 15, 16 in the sections 11 and 12 respectively. In Figures 2 and 9 we have shown two pairs of gathering chains 17, 17 and 18, 18 and in addition there may be provided as indicated in Figures 1 and 2 a second series of gathering chains 19, 19 and 20, 20 above the first series of chains. Said chains are all driven through suitable gearing. For example, as indicated in Figure 9, a shaft 20 (preferably driven by the engine 9 at a rate corresponding to that of the tracks 7) drives through beveled gearing 21, 22, a shaft 23 which in turn through sprockets and chains 24 turns a series of short shafts 25. Each of the latter is geared as indicated in Figure 9 to turn sprockets 26 meshing with the respective gathering chains 17, 17, 18, 18. The chains 24 as indicated in Figure 1 also mesh with sprockets 27 on shafts similar to the shafts 25 for driving the upper set of gathering chains 19, 19 20, 20 as will readily be understood. It will be apparent that the chains 17, 17 and 19, 19 draw into the machine the cane from one row while the gathering chains 18, 18 and 20, 20 draw into said machine the cane in the adjacent row. Extending upwardly at the front of the machine are hood members 21a, 22, and 23, each having slots 24 through which are adapted to project the fingers 14 of the respective gathering chains. As will be seen from Fig. 2, the hood members 21a and 22 are provided with portions 21', 22' converging toward the elevator 15; while portions 22'', 23' of hood members 22, 23 converge toward elevator 16. Thus said hood members serve to deflect cane into alignment with said elevators and facilitate the feeding of the cane to said elevators by the gathering chains.

Figure 10:
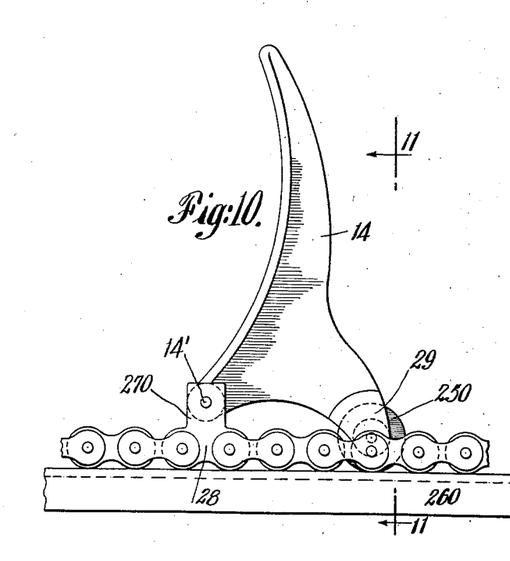
Fig. 10 is a detail view on an enlarged scale showing one of the gathering chain fingers and its relation to the chain.
Figure 11:
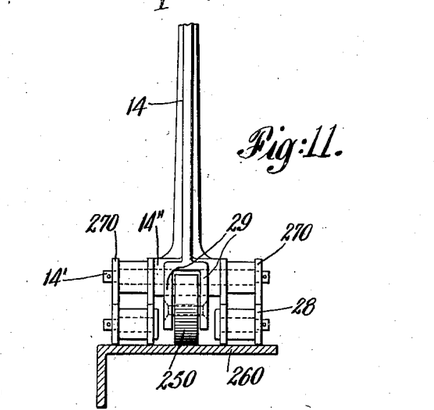
Fig. 11 is a view in sectional elevation taken on line 11—11 of Fig. 10.

We have provided means whereby fouling of the cane against the elevators by the teeth of the gathering chains is avoided, while at the same time said chains effectively perform their intended function of delivering cane to said elevators. For this purpose the fingers 14 are shown pivotally connected to the chains and are provided with rollers 250 cooperating with rail or guide members 260 around which the respective chains travel. Thus, for example, each of the fingers 14 may be pivoted to upstanding projections 270 of links 28 of the associated chain, as illustrated in Figs. 10 and 11. The chain in said figures is shown as double, or comprising two endless series of links, and the pivot pin 14' of the finger 14 in said figures is shown connecting opposite links 28, while base portion 14'' of said finger fits between said links and spaces the same. Roller 250 is rotatably mounted in bifurcated extension 29 of the finger. It will be seen that when, during the travel of the chain, roller 250 moves beyond the end 30 (Fig. 9) of guide 260, the finger 14 is free to be turned about its pivot and as the result of the pressure of the cane between the adjacent elevator and said finger the latter folds into a position corresponding to that indicated at X in Fig. 9. The finger remains in this position until roller 250 comes into contact with a cam extension 31 of guide 260, as indicated at Y in Fig. 9, whereupon said finger is again forced outwardly into its position shown in Figs. 10 and 11 for drawing cane into the elevator. With the construction above described, it will be apparent that the fingers of the various chains are positioned properly for feeding cane into the machine, and are also conditioned at the proper time for yielding and avoiding fouling of the cane against the elevators.

Pivotally mounted at the front of the machine are forwardly projecting arms 32, each mounted on a roller 33. At the forward end of each arm there is provided a downwardly inclined finger 34, extending adjacent to or into contact with the ground. The fingers 34 and arms 32 are adapted to pick up any cane which may be lying on the ground and to bring the same into the path of the gathering chains. Each of the fingers 34 is hinged to the respective arm 32 and is spring pressed, so that, while normally traveling in the extended position shown in Fig. 1, upon meeting a stump, rock, or similar obstruction the finger bends backwardly and raises the arm 32 to clear said obstruction as will be readily understood.

Each of the elevators 15, 16 consists of an endless chain having teeth 35, such for example, as shown in Patent No. 1,651,920, above mentioned. Said elevators may be driven from the engine 10 in any convenient way. For example, the elevator 15 is shown in Fig. 1 as driven by a wheel 36 through a belt or chain 37 which in turn is operated by a wheel 38. The latter may be operated from engine 10 through any convenient connections such for example as shaft 39, bevel gearing in housing 40, shaft 41, and a worm in housing 42 engaging a worm wheel 43 rotatable with a pinion 44 which actuates said wheel 38. It will be understood that the elevator 16 may be driven from the worm wheel 43 through chain and pinion connections, similar to those through which said worm wheel drives the elevator 15.

Figure 7:
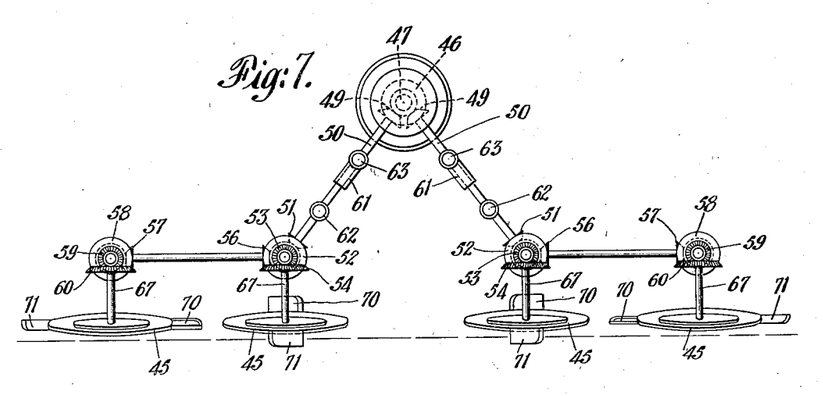
Fig. 7 is a view in front elevation of the cutter disks and their driving mechanism.
Figure 8:
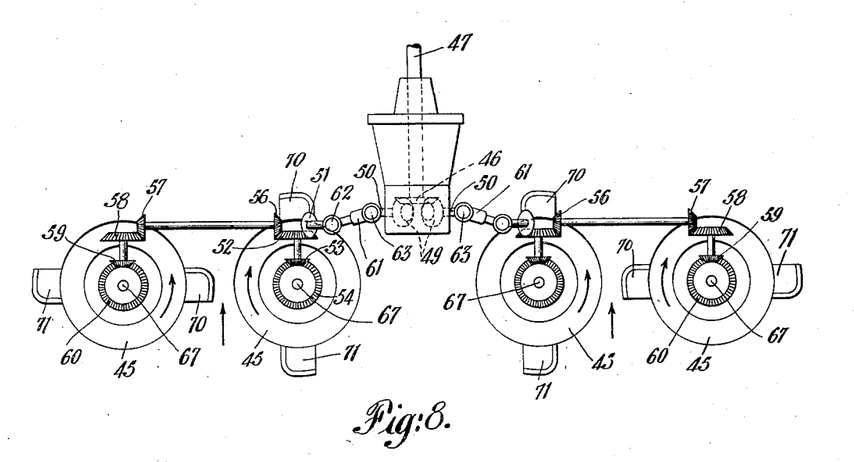
Fig. 8 is a plan view of the structure shown in Fig. 7.

A plurality of cutter disks 45 are rotatably mounted in the front portion of the machine adjacent the elevators 15, 16, and are adapted to sever the growing cane from the ground. These disks are shown in Figures 2, 7, and 8 as arranged in pairs for cutting the cane in two rows simultaneously. Said disks may be driven from the engine 10 through any convenient connections. For example, those illustrated in Figs. 1, 7, and 8 comprise a bevel gear 46 driven by the engine shaft 47 and through a bevel gear 49, shaft 50 and bevel gear 51 driving bevel gear 52. The latter, through bevel gears 53, 54, drives one of the associated pair of cutter disks 45, and also through bevel gear 56, 57, 58, 59, 60 rotates the other cutter disk of said pair in a direction opposite to that of the first mentioned disk. Thus the two cutter disks aforesaid are turned simultaneously in opposite directions. The shaft 50 may be formed of telescoping sections 61 and is shown provided with universal joints 62, 63. The other pair of cutter disks may be driven from bevel bear 45 through a series of connections similar to those above described in connection with the first pair of disks.

As indicated in Fig. 1, each of the cutter disks 45 may be supported from the framework of the machine, by a stay 65 fastened at one end to said framework, and at the other end to a housing 66 in which are mounted the drive gears as well as the shaft 67 to which said disk is attached. The stay 65 may be hinged to the framework or may be flexible to permit the disk to rise and fall in response to variations in the ground. It will be seen that the lower surface 68 of the disk is of convex or conical formation and that the axis of rotation of the disk is inclined, the shafts 67 being positioned at an angle to the vertical. In this way the disk, while rotating, is permitted to float along the ground and a minimum of ground resistance to the travel and rotation of the disk is encountered. The universal joints 62, 63, and telescopic drive shaft sections 61 above referred to readily permit the disks and the housings 66 to shift with respect to the framework of the machine without interfering with the mechanism for rotating said disks.

Each disk 45 is shown provided with a pair of knives or cutting elements 70, 71; the knives of each disk of a pair being set at right angles to those of the other disk of the pair, as indicated in Fig. 8. In this way each knife on one disk of the pair operates one quarter of a revolution ahead of the corresponding knife on the other disk, said knives thus coming into action alternately. Preferably each of the knives 70, 71, in cutting the cane, extends slightly below the ground, as indicated in connection with the knife 71 in Fig. 1. In this way the cane may be severed below the ground and portions of the cane rich in sugar but not ordinarily cut in the methods employed heretofore may be harvested.

We have further provided an improved cutter disk structure wherein the knives 70, 71 may be readily inserted and removed. Also, as a safeguard, provision is made for slippage between the cutter disk and the driving shaft 67 whenever said disk or the knives carried thereby encounter an obstruction, so that the shaft 67 may rotate without turning said disk until the obstruction has been cleared. As shown more particularly in Figs. 4-6, our improved cutter disk structure comprises an upper plate 72, an intermediate plate 73, and the bottom cambered plate 68 above referred to; said three plates being riveted, welded or otherwise secured together to form a unit. The knives 70, 71 are mounted between the plates 72 and 73. As shown more particularly in connection with knife 71 in Fig. 4, each knife may be suitably fitted between ribs 74, 75, secured to or forming part of one of the plates 72, 73, and may be held in position by a pivoted latch 76 pressed by a spring 77 into engagement with a shoulder 78 on said knife. Said latch may be manipulated for disengagement from said knife through a pin 79 projecting through a slot 80 in the top plate 72. A screw 79' carried by said latch also projects through said slot and normally prevents the latch from being retracted, but upon removing said screw, the latch may be readily withdrawn from engagement with the shoulder 78. Shaft 67 is provided with a base portion 81 having a countersunk annular recess 82 receiving an annular plate 83 and also having an interior central chamber 84. Secured to the drive shaft through a threaded bolt 85 is a hub member 86 having an extension 87 fitting within the chamber 84, and also provided with an annular shoulder 88. The annular plate 83 may be secured to the base portion 81 of shaft 67 by pins 89. Said plate is shown provided with a downwardly projecting annular extension 90. Between said extension and the annular flange 88 of the hub member 86 there is mounted a plate 91 of spring material which plate may be secured to said hub and member 83, for rotation therewith, through dowel pins 92. Secured to the cutter disk in any suitable way and forming part thereof is the annular member 93, the inner bore 94 of which receives and surrounds the annular extension 90 of plate 83. Said member 93 may be welded to the cutter disk plates 68, 72, and 73. In addition we have shown secured to said member 93 a plate 68' having an inclined or frustro conical periphery forming a continuation of the periphery of plate 68, and having an opening 68'' concentric with the hub 86 and receiving the flange portion 88 thereof. Member 93 is provided with apertures in which are positioned balls 95; the latter being of a diameter slightly larger than the depths of the openings aforesaid, whereby said balls project through said openings. As shown, the balls rest upon the resilient element 91, while at their upper surfaces said balls fit into conical pockets or depressions 83' in the plate 83. The resilient member 91 forces the balls 95 with sufficient pressure against the plate 83 to effect a driving connection between shaft 67 and the cutter disk member 93. Consequently, rotation of the shaft 67 normally carries with it the cutter disk. If, however, said disk or one of the knives 70, 71 should meet with an obstruction, the disk shaft 67 turns without rotating said disk, the balls 95 being forced downwardly and imparting additional flexure to the resilient member 91. When the obstruction is cleared, said member 91 restores the balls into engagement with the pockets 83' and the rotation of the cutter disk by the shaft 67 is resumed.

The cane cut by the knives on the respective pairs of disks 45 falls upon the elevators 15, 16. Each of the elevators feeds the cane which falls upon it to an associated pair of rotating rollers 100, 101. One pair of said rollers is provided for the elevator 15 and another pair for elevator 16. As shown in Figure 1, an endless belt 102 having prongs or the like may be positioned in the upper forward part of the machine to assist in directing the cut cane into the grip of the associated pair of rollers. The belt 102 as shown in Fig. 1 may be driven through a chain 103 operated by a sprocket 104 driven from the shaft 39 through a pulley 105 suitably geared to said shaft, belt 106 and pulley 107 rotatable with sprocket 104. It will be understood that a belt similar to belt 102 may be provided in connection with the elevator 16 and driven from the engine shaft 32 through similar connections. The rollers 100, 101 are pneumatic, each comprising a tread which is inflated preferably to a low pressure in the neighborhood of three or four pounds. Roller 100 is driven by the worm in housing 42, the worm wheel 43 engaged by said worm being fastened to the shaft of said roller. Roller 102 is shown driven by the chain or belt 37 previously mentioned. The companion pair of rollers on the other side of the machine are, it will be understood, driven similarly. As shown in Fig. 2, both rollers 100 may be mounted on a common shaft driven by the worm in housing 42, through the worm wheel 43 on said shaft. Inasmuch as the sections 11 and 12 of the machine corresponding respectively to the elevators 15, 16 and their associated pair of feeding rollers 100, 101 are duplicates, a description of the operations performed upon the cane delivered from the elevator 15 to its corresponding set of rollers will be sufficient and need not be repeated for the elevator 16 and its associated mechanism.

Figure 3:
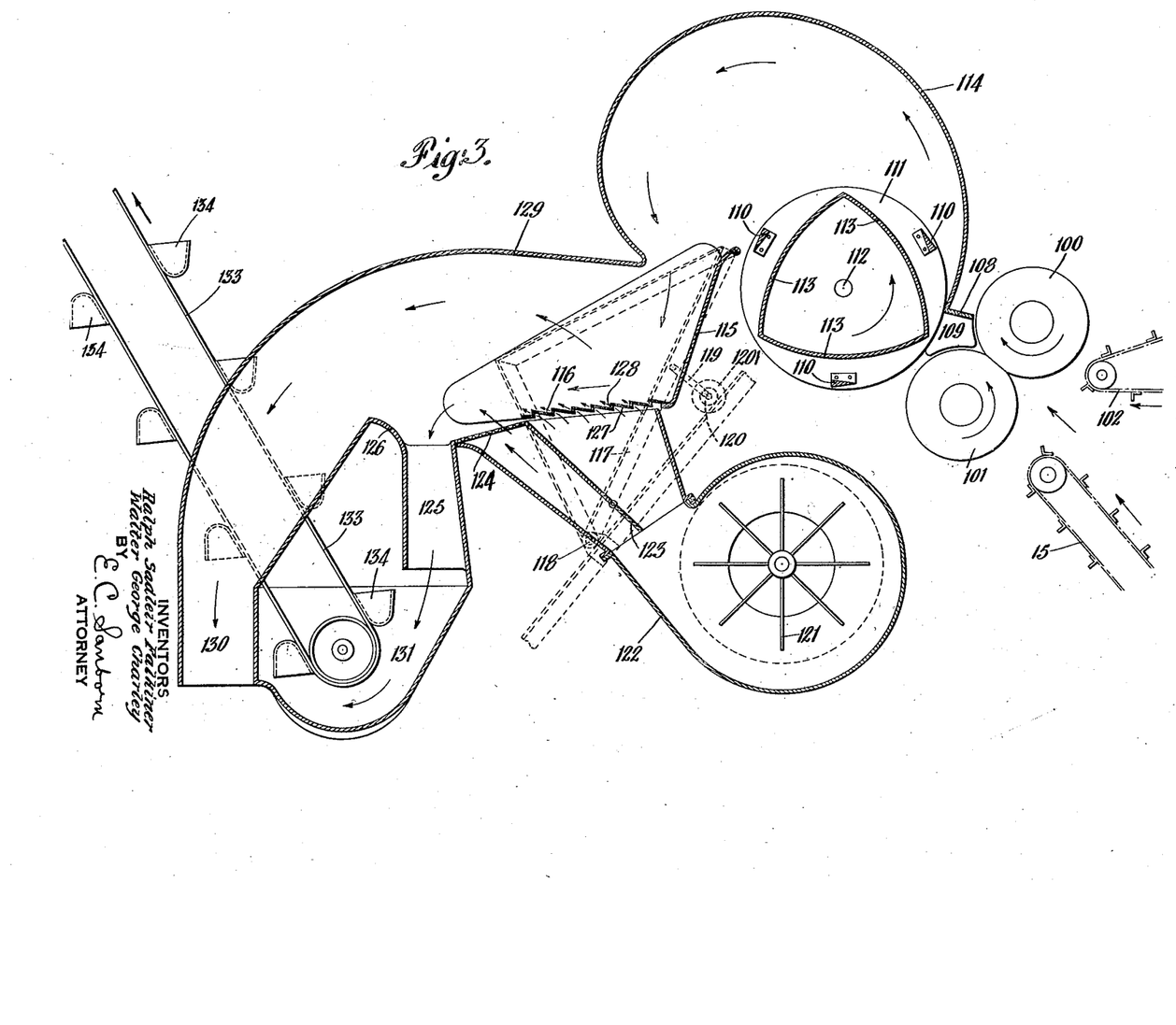
Fig. 3 is a view in sectional elevation on an enlarged scale showing the rotary knives for chopping the gathered cane, together with means for separating the trash and severed tops from the cane.
Figure 13:
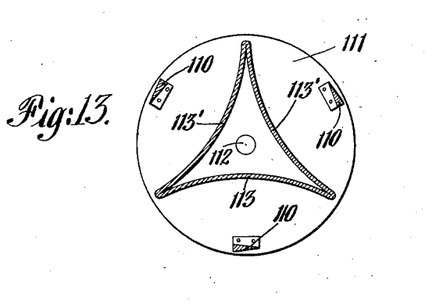
Fig. 13 is a sectional elevational view showing a modified form of rotary chopping device.

As the cane passes from elevator 15 into the associated pair of rollers 100, 101, said rollers feed the cane as shown in Fig. 3 beneath a fixed blade or plate 108, which may have side pieces 109 to act as guides, into engagement with the knives 110 of the rotating chopper 111. Said chopper may take the form shown in the pending U. S. application of R. S. Falkiner, S. N. 343,517, filed February 28, 1929, and in the companion Falkiner British application 14,127 of 1928, wherein it comprises a pair of disks between which the knives 110 are mounted, said cutter being secured to spindle 112 journalled in the machine frame and being driven through bevel gearing by the shaft 39. Secured to the inner faces of said disks is a deflector comprising three convex blades 113 arranged behind the blades 110 and rotating with the chopper. In the aforesaid Falkiner application the deflector plates are concave, as shown at 113' in Fig. 13 in the present application; the convex form of deflector plates here shown being simply a modification or variation of the concave plates referred to. If desired, the form of deflector plates shown in Fig. 3 may be provided in section 11 of the machine and the concave deflector plates in the companion section 12, or either form of deflector plates may be utilized in both sections. As the chopper 111 is rotated in the direction shown by the arrow in Fig. 3, the cane and trash fed thereto through the rollers 100, 101 is cut with an upward motion; the pieces just after severance meeting the deflector plates 113 and being ejected upwardly out of the path of the cutting blades so that they cannot foul the knife on the next cut. The chopper 111 is shown mounted within a hood 114 whereby the cut pieces are directed as indicated by the arrows. In addition to the hood or baffle 114 a second baffle 115 is shown whereby the cut material as it is discharged from the chopper is caused to fall on a screen 116. The latter is carried by a frame 117 pivoted at 118 and rocked or vibrated through a link 119 connected eccentrically to a disk 120 suitably driven from the engine 10 so that in operation the screen 116 is rocked about the pivot 118. As shown in Fig. 1, the disk 120 may be driven from shaft 39 through a chain 120' engaging a sprocket 120'' rotatable with said disk and gear 1201 driven by said shaft. Beneath the screen 116 is arranged a rotary fan or blower 121 in a tapered chamber 122 having a baffle 123 which extends across the chamber and divides it into two unequal columns, the screen being arranged over the column having the mouth of greater cross sectional area. Across the mouth of the second or smaller column a preferably fixed screen 124 is arranged at an angle to the screen 116 as shown, to assist the travel of the cane thereover and to lead it into a discharge chute 125. Chute 125 is provided with a baffle 126 which may, if desired, be made adjustable. Screen 116 may consist of a series of corrugated layers 127 arranged one above the other with air spaces 128 between each layer whereby a series of corrugated steps with air spaces in between is formed. The corrugations assist to turn the cut pieces of cane end on, which facilitates their travel over the screen and also places them in a better position for the operation of the air blast.

This combined screen and air blast construction forms the subject of our pending application S. N. 357,708 filed April 24, 1929, and is not claimed herein. Any other suitable type of screen and air blast construction may be used.

For the purposes of the present application the action of the screen and air blast may be briefly summarized as follows: The cut material, as thrown upwardly by the cutter or chopper 111, meets the baffle 114 which directs it on the vibrating screen 116, the air blast also issuing through the air spaces 128. This blast causes the lighter trash to be blown out into contact with the baffle or hood 129 which directs said lighter trash to the discharge point 130 without disturbing the cane, the latter rolling over on the screen 124. An air blast also issues through the perforations of the screen 124 and owing to the position of the baffle 123 the air blast through the screen is of a higher pressure than the blast through the screen 116. Thus, any heavier trash which may have escaped removal on the screen 116 is then blown out and over the baffle 126 to discharge point 130. The air blasts are of such pressure that they fail to lift the good cane to any appreciable extent so that the cane rolls off the screen 124 into the chute 125. At the same time the blast through the screen 124 is sufficiently strong to prevent trash from falling into said chute 125. The trash discharged through the openings 130 in the respective sections 11 and 12 of the machine falls, as directed, on to the cut rows, which is a desirable feature in the machine.

As the cane falls into the chutes 125 one of which is provided in each section 11 and 12 of the machine, it drops into hopper portions 131 below said chute respectively. The floors of said hoppers are inclined toward the middle or intermediate section of the machine and communicate with a compartment 132 in said intermediate section. Communicating with said compartment 132 is a conveyor 133 provided with buckets 134 which scoop the cane delivered to said compartment and draw said cane upwardly for discharge into a cart or other vehicle. Conveyor 133 may be driven from the engine 10 in any desired way, as, for example, by a belt 135 passing over a pulley 136 which rotates with pulley 104 previously mentioned, said belt also passing over the pulley 137 of said conveyor. The blower 121 may be driven by a belt 138 passing over a pulley 139 on the blower shaft and also passing over a pulley 140 driven by the engine 10.

We have provided means whereby the ground knives, gathering chains, and elevators, may be raised and lowered with respect to the trucks 6. For this purpose, the main frame 5 is pivotally supported on said trucks; said frame being shown pivoted coaxially with the sprockets 8. The frame 5 includes pairs of vertical beams 140, 140 and 141, 141, the beams of each of said pairs being connected together by braces or struts 142 (Fig. 12). The two pairs of beams may be connected together by a beam extending across the full width of the machine. Each pair of beams aforesaid is slidably engaged with a corresponding one of a plurality of frames mounted on the respective trucks 6. As shown, each of said frames comprises a pair of upwardly extending beams 144 connected at the top by a cross-piece 145. Each frame may also comprise beams 146 (Fig. 1) extending parallel to the respective beams 144 and connected thereto by bars 147. At their lower ends each beam 144 and its companion beam 146 may be united by a foot-piece 148, each pair of foot-pieces being journaled on a rod 149 fastened by a bracket 150 to the associated truck 6. In this way the frames 144 may tilt in response to raising of the frame 5 and associated beams 140, 141 about the sprocket wheel axes. To the rear of each of the vertical beams 140, 141, an upwardly extending beam 151 may be provided, each of said beams 151 being secured to the main frame 5; and between each pair of beams a cross bar similar to the bars 142 may be secured, as will be readily understood. Rotatably supported on cross bar 142 of the beams 140 and on the corresponding cross bar of the companion pair of beams 151 are pulleys 152, 153; while a similar pulley 154 is supported by a cross bar 142 of beams 141 and by the corresponding cross bar of the pair of beams associated with said beams 141. Each of the frames 144 has supported on the upper end thereof a corresponding one of a pair of pulleys 155, 156, while a winch 157 may be carried by the cross bar 143 extending across the machine and secured to the pairs of beams 146. As shown in Fig. 12, a cable or wire rope 157a is secured at one end to a cross bar 142 of beams 141, and is then passed around pulleys 156, 154, 152, 155, and 153, and thence to the winch drum 157. The latter may be operated through a worm wheel 158 and worm 159, which in turn may be operated either manually through suitable gearing or by the engine 10. We have shown a sprocket wheel 160 rotatable with said worm and operated by a chain 161 (Fig. 1) and sprocket wheel 162 adapted to be clutched to the shaft 39, by any suitable or convenient means, for rotation by the engine 10 in either direction as desired. It will be apparent that upon rotation of the winch drum 157 in one direction, an upward pull will be exerted on the cross beams 142, and hence on the main frame 5, whereby the latter is raised, and the ground knives, gathering chains, and elevators lifted with said frame to inactive position. Upon rotation of said drum in the opposite direction, said frame 5 and associated parts are restored to active position. The pick-up arms 32 are also movable with the frame 5 to active and inactive position, and in addition said arms may at any time be thrown out of action by turning them upwardly about their pivots 32'.

If desired, there may be attached to the front of the machine, frames, one for each row, similar to the frame 11 shown in the U. S. application of R. S. Falkiner, Serial No. 343,516, filed Feb. 28, 1929, and in the Falkiner British application No. 14,127, dated May 14, 1928, whereby the cane is bent away from the machine and the severed cane is fed to the elevators butts first.

The terms and expressions which we have employed are used as terms of description and not of limitation, and we have no intention, in the use of such terms and expressions, of excluding any mechanical equivalents of the features shown and described or portions thereof, but recognize that various structural modifications are possible within the scope of the invention claimed.

What we claim is:

1. In a cane harvesting machine, an elevator, a chain provided with fingers for feeding cane to the elevator, and means whereby fouling of the cane by said fingers against the elevator is prevented.

2. In a cane harvesting machine, an elevator, a chain provided with fingers for feeding cane to said elevator, and means providing for yielding of said fingers successively to non-fouling position in response to pressure on said fingers of cane delivered to said elevator.

3. In a cane harvesting machine, an elevator, a gathering chain for delivering cane to said elevator and having a finger yieldably connected thereto, and means coordinated with the travel of the chain whereby said finger is placed into and out of condition for gathering cane.

4. In a cane harvesting machine, in combination with cane cutting means comprising a cutter disk, a shaft for rotating said disk, and means for transmitting movement from said shaft to said disk, means providing slippage between the shaft and disk in the event that the disk meets with an obstruction.

5. In a cane harvesting machine, a rotatable cutter disk, a cutting element carried by said disk, and a manipulative member movable into and out of engagement with said element to retain the latter on said disk or to release said element from the disk.

6. In a cane harvesting machine, an element for severing growing cane from the ground, said element having a convex lower surface and being rotatable about an axis inclined to the vertical, means for driving said element, and connections between said driving means enabling said element to rise and fall in response to engagement with ground irregularities as it travels thereover.

7. In a cane harvesting machine, an elevator, gathering means for drawing cane toward said elevator, cutting means for severing said cane below the ground, and means for preventing said gathering means from fouling the cane against the elevator.

8. In a cane harvesting machine, an elevator, gathering means for drawing cane toward said elevator, cambered cutting means for severing said cane below the ground, and means for preventing said gathering means from fouling the cane against the elevator.

9. In a cane harvesting machine, an elevator, gathering means for drawing cane toward said elevator, cutting means for severing said cane from the ground, a frame supporting said gathering means and said cutting means, traction means supporting said frame, a prime mover for operating said traction means and said gathering means, a second prime mover for operating said cutting means, and means operated by one of said prime movers for raising said frame with respect to said traction means.

10. In a cane harvesting machine, an elevator, gathering means for drawing cane toward said elevator, cutting means for severing said cane from the ground, a frame supporting said gathering means, trucks supporting said frame, and means comprising a winch and cable cooperating with said frame for raising the latter with respect to said trucks.

11. In a cane harvesting machine, a main frame, trucks on which said frame is mounted, means carried by said frame for harvesting simultaneously a plurality of rows of cane, a winch carried by said frame, and means comprising a cable and a series of pulleys whereby operation of said winch raises and lowers said frame with respect to said trucks.

12. In a cane harvesting machine, a main frame pivotally mounted on a pair of trucks, and means for raising and lowering said frame with respect to said trucks, said means comprising pairs of vertical beams on said frame cooperating with corresponding frames pivotally mounted on said trucks.

13. In a cane harvesting machine, a main frame pivotally mounted on a pair of trucks, means on said frame engaging guiding means pivotally connected to said trucks, and means cooperating with said first named means and with said guiding means for raising and lowering said frame with respect to said trucks.

14. In a cane harvesting machine, a main frame pivotally supported on a pair of trucks, guiding frames carried by said trucks and engaged by means on said main frame whereby the latter is guided when raised or lowered with respect to said trucks, and winch and pulley means on said main frame cooperating with a cable and with pulleys on said guiding frames for effecting raising and lowering of said main frame.

15. In a cane harvesting machine, a frame, an element for severing cane from the ground, said element having a convex lower surface, and means pivotally connected to said frame for supporting said element for rotation about an axis inclined to the vertical and enabling said element to float along the ground with the back of said element raised and its front engaging the ground.

16. In a cane harvesting machine, a frame, a pair of rotatable disks spaced apart from each other, each of said disks having a convex lower surface, means supporting said disks for rotation about axes inclined to the vertical, a plurality of knives carried by each disk, the knives of one of said disks being each displaced angularly with respect to the respective knives of the other disk so that the knives on the respective disks come into action alternately during rotation of the disks, and means pivotally connecting the respective discs to said frame for enabling said discs to float during the travel thereof along the ground with a portion of each disc engaging the ground and other portions thereof raised.

17. In a cane harvesting machine, a frame, an element for severing cane from the ground, said element having a convex lower surface and being rotatable about an axis inclined to the vertical, means for driving said element, means whereby said driving means may operate without actuating the cutting means when the later meets with an obstruction, and means pivotally connecting said element to said frame for enabling the latter to float along the ground with the back of said element raised and its front engaging the ground.

18. In a cane harvesting machine, a conveyor, means traveling in an endless path and provided with fingers for feeding cane to the conveyor, and means whereby fouling of the cane by said fingers against the conveyor is prevented.

19. In a cane harvesting machine, a conveyor, means traveling in an endless path and provided with fingers for feeding cane to said conveyor, and means providing for yielding of said fingers successively to non-fouling position in response to pressure on said fingers of cane delivered to said conveyor.

20. In a cane harvesting machine, means traveling in an endless path and having a finger yieldably connected thereto, means cooperating with said finger throughout a certain extent of travel of the first mentioned means for maintaining the finger relatively rigid with respect to the first-mentioned means with provisions for permitting said finger to yield at a given point in said travel in response to pressure exerted thereon by the cane.

21. In a cane harvesting machine, a conveyor, means traveling in an endless path for delivering cane to said conveyor and having a finger yieldably connected thereto, and means coordinated with the travel of the first-named means whereby said finger is placed into and out of condition for gathering cane.

In testimony whereof, we have signed our names to this specification.
RALPH SADLEIR FALKINER.
WALTER GEORGE CHARLEY.